United States Patent [19]
Zwicker

[11] Patent Number: 4,796,925
[45] Date of Patent: Jan. 10, 1989

[54] SAFETY RETAINER CLIP

[76] Inventor: Fred Zwicker, 7075 State Rt. 14, By-Pass, Canfield, Ohio 44406

[21] Appl. No.: 95,160

[22] Filed: Sep. 11, 1987

[51] Int. Cl.⁴ ............................................. F16L 35/00
[52] U.S. Cl. ..................................... 285/114; 285/253
[58] Field of Search .................... 285/8, 114, 253, 115, 285/116, 256, 259

[56] References Cited

U.S. PATENT DOCUMENTS

| | | | |
|---|---|---|---|
| 747,052 | 12/1903 | Dunfee | 285/8 X |
| 893,170 | 7/1908 | Huser | 285/114 |
| 1,101,844 | 6/1914 | Gething | 285/114 |
| 1,426,086 | 8/1922 | Lowrey | 285/114 |
| 1,599,775 | 9/1926 | Lamb et al. | 285/114 |
| 2,864,378 | 12/1958 | Suhneller et al. | 285/114 |
| 3,574,355 | 4/1971 | Oetiker | 285/256 |
| 4,093,282 | 6/1978 | Kyriakodis | 285/114 |
| 4,340,244 | 7/1982 | Scott | 285/114 |
| 4,603,888 | 8/1956 | Goodall et al. | 285/259 |

Primary Examiner—Dave W. Arola
Attorney, Agent, or Firm—Harpman & Harpman

[57] ABSTRACT

A safety retainer chip for use on pressure hose fittings that provides a secondary retaining device to prevent the unintentional separation of the fitting and the hose during use in high pressure applications evident in sandblasting or the like.

3 Claims, 1 Drawing Sheet

U.S. Patent   Jan. 10, 1989   4,796,925
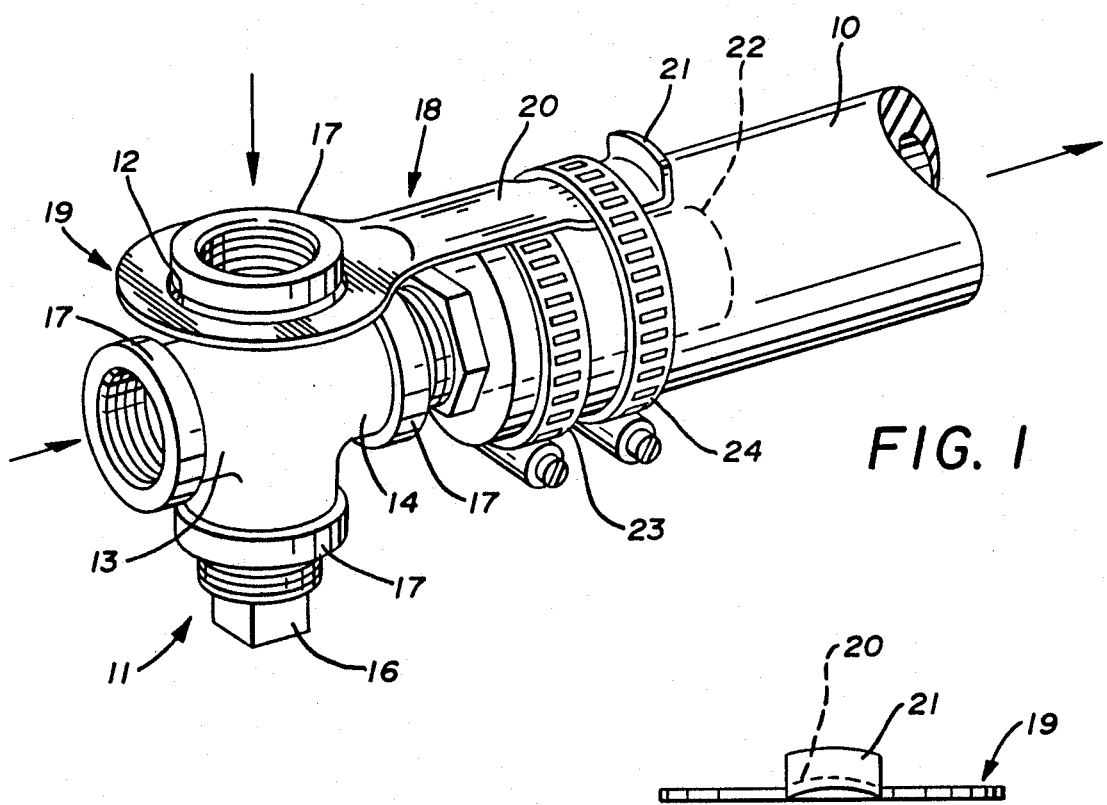
FIG. 1
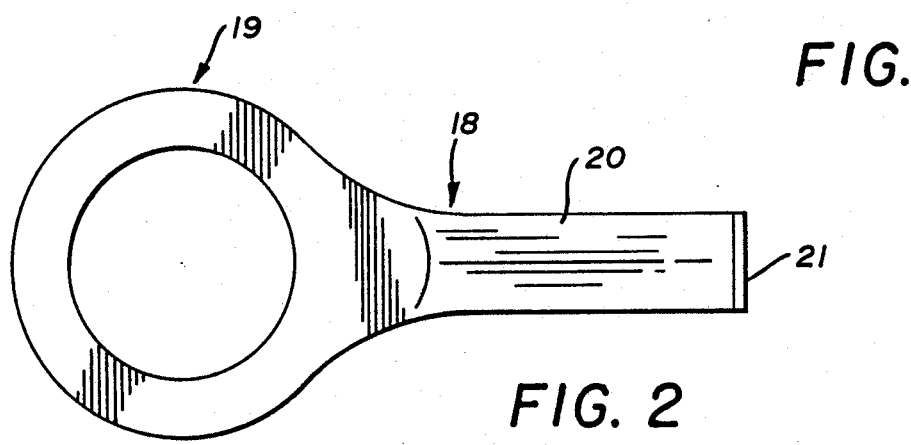
FIG. 2
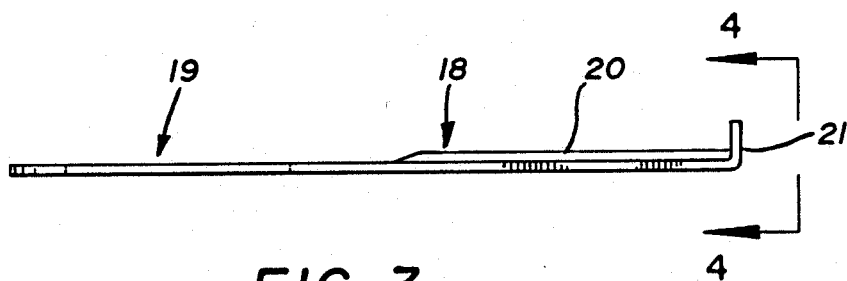
FIG. 3
FIG. 4

SAFETY RETAINER CLIP

BACKGROUND OF THE INVENTION

1. Technical Field

This invention relates to retaining clamps and end fittings used on pressure hose fittings to secure the fitting to the hose should the hose become loose during use.

2. Description of Prior Art

Prior Art devices of this type have relied on a variety of different design configurations to engage a portion of the fitting and the hose to which it is clamped, see for example U.S. Pat. Nos. 4,603,888 and 3,574,355.

In U.S. Pat. No. 4,603,888 an end fitting is disclosed for rubber steam hoses which comprises a spiral configured inner stem over which a rubber hose is fitted and an outer ribber clamp compressing the rubber hose against the stem, locking same thereto.

U.S. Pat. No. 3,574,355 discloses a hose connection that extends around the end of a hose having a stem fitting inserted therein. The hose connection has an annular flange around one end and an apertured vertically aligned sleeve member on the other end. A washer is positioned on the hose end with the hose connector thereover. The stem is inserted and a clamping element compresses the sleeve against the ribs stem.

SUMMARY OF THE INVENTION

A safety retainer clip to secure a hose fitting to a hose in high pressure applications. In use, hoses often come loose and blow off the end of pressure fittings causing a damaging release of pressure fluid and intraned material within. The safety retainer clip is secured to the end portion of the hose by multiple inner dependent clamps and to the hose fitting by an enlarged apertured portion which is engaged over an upstanding section of the fitting itself.

DESCRIPTION OF THE DRAWINGS

FIG. 1 is a perspective view of the safety retainer clip in use;

FIG. 2 is a top plan view of the safety retainer clip;

FIG. 3 is a side plan view of the safety retainer clip of FIG. 2; and

FIG. 4 is an end view on lines 4—4 of FIG. 3 of the safety retainer clip.

DESCRIPTION OF THE PREFERRED EMBODIMENT

A safety hose retainer clip for use on a high pressure hose 10 having a pressure fitting 11 positioned on the end thereof. The fitting 11 is used in this embodiment to innerconnect sandblast equipment to the high pressure hose 10. The fitting 11 has multiple threaded outwardly extending outlets 12, 13, 14, 15 and is shown having a threaded plug 16 within one of said outlets. Each outlet has a flanged outer ring 17 as will be well known and understood to those skilled in the art. The safety retainer clip is of a generally flat, thin body member 18 having an enlarged apertured fitting end 19 and an elongated hose end 20. The elongated hose end 20 is curved transversely to better conform to the surface of the hose 10. An arcuate upstanding flange 21 is formed on the free end of said hose end 20.

In operation the hose 10 is fastened to the fitting 11 via a threaded ribbed adapter 22 shown in broken lines in FIG. 1 with an adjustable clamp 23 compressing the hose 10 thereon. The safety retainer clip's apertured fitting end 19 is positioned over one of the flanged outer ring 17 on the outlet 12. The safety retainer clip's hose end 20 extends along the high pressure hose 10 over the clamp 23 and beyond. A secondary clamp 24 is positioned over the safety retainer clamp's hose end 20 adjacent the clamp 23 inwardly of said flange 21, best seen in FIG. 1 of the drawings.

As the clamp 24 is tightened, a portion of the clamp's elongated hose end 20 is distorted downwardly under the clamp 24 providing a secure inner lock of the safety retainer clip to the hose 10.

It will be evident from the above description that in use should the hose 10 loosen from the adapter 22 it could blow off causing severe injury to the user. With the safety retainer clamp securely fastened to the hose 10 between the clamps 23 and 24 and with the upstanding flange 21 engageable against the clamp 24 accidental removal of the hose 10 is not possible. The apertured fitting end 19 extending around the threaded outlet 12 prevents the fitting 11 from accidentally separating from the hose 10 under all conditions.

It will be seen that the safety retainer clip is capable of being used on many different hose fittings as long as they have at least one upstanding fitting adjacent the insertion part of the hose.

Thus, it will be seen that a new and useful safety retainer clip has been illustrated and described and it will be apparent to those skilled in the art that various changes and modifications can be made therein without departing from the spirit of the invention.

Therefore, I claim:

1. A safety retainer clip for use on a high pressure hose and associated fitting having multiple outlets comprises a single elongated flattened body member, said body member having an apertured enlarged end portion for fitting around one of said outlets and a oppositely disposed single elongated transversely curved hose portion extending from said body member and terminating in a free end, an arcuate upstanding flange on the free end of said elongated hose end portion, a first clamping means separate from and secured over said elongated hose end portion and said hose adjacent said upstanding flange, a second clamping means separate from said hose portion and engageable on said hose adjacent said first clamping means.

2. The safety retainer clamp of claim 1 wherein said aperture in said enlarged hose end portion is of an interior diameter greater than the exterior of said multiple outlets on said fitting.

3. The safety retainer clamp of claim 1 wherein said first clamping means and said second clamping means are adjustable.

* * * * *